P. DIGNAN.
CLUTCH.
APPLICATION FILED MAY 13, 1916.
1,240,829.  Patented Sept. 25, 1917.
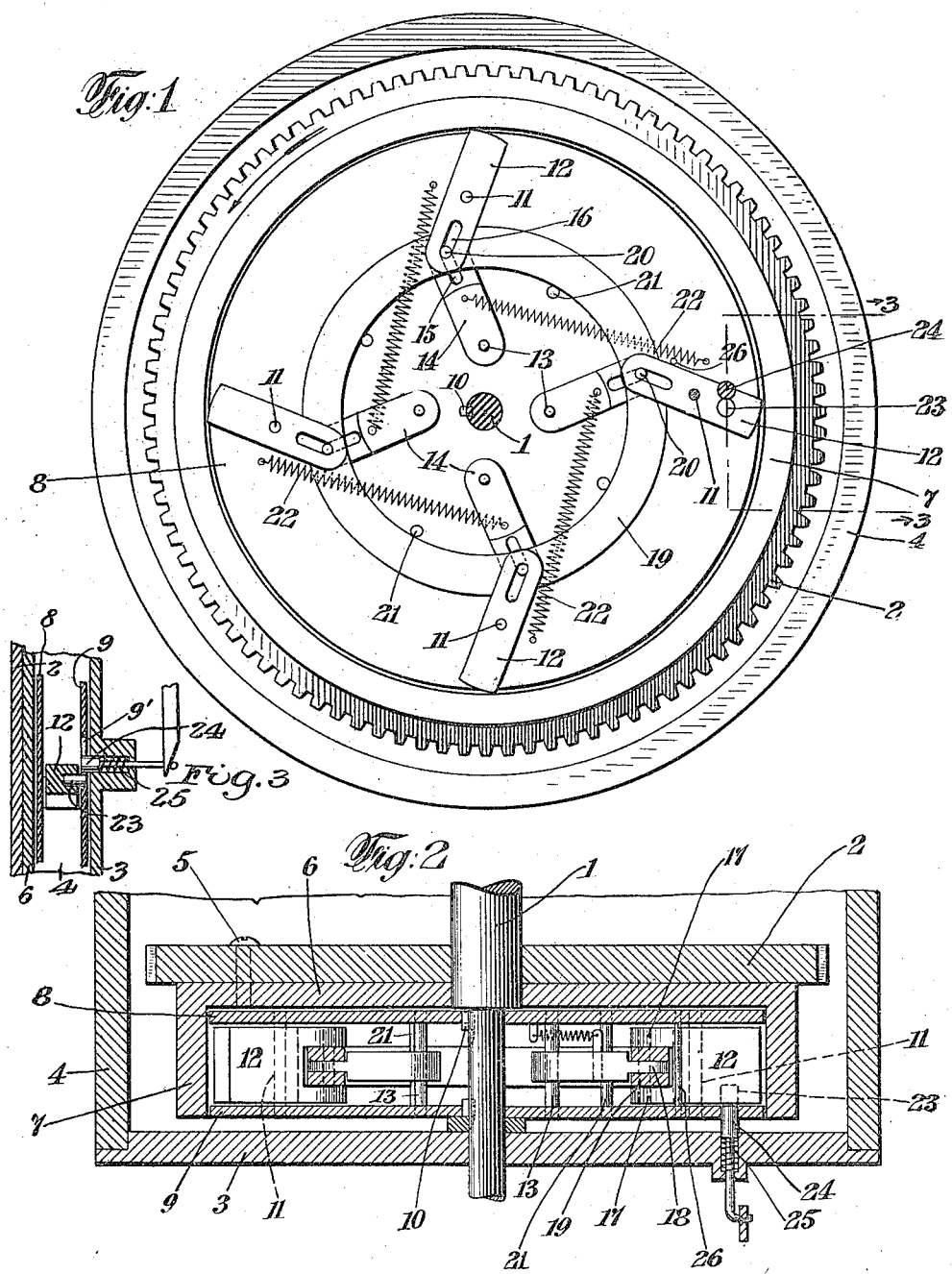

UNITED STATES PATENT OFFICE.

PERCIVAL DIGNAN, OF NEW YORK, N. Y., ASSIGNOR TO R. H. MACY & CO., A COPARTNERSHIP COMPOSED OF JESSE ISIDOR STRAUS, PERCY S. STRAUS, AND HERBERT N. STRAUS.

CLUTCH.

1,240,829.  Specification of Letters Patent.  Patented Sept. 25, 1917.

Original application filed November 12, 1915, Serial No. 61,004. Divided and this application filed May 13, 1916. Serial No. 97,377.

*To all whom it may concern:*

Be it known that I, PERCIVAL DIGNAN, a citizen of the Commonwealth of Australia, and a subject of the King of Great Britain, and a resident of the borough of Manhattan, city, county, and State of New York, have invented certain new and useful Improvements in Clutches, of which the following is a specification.

My invention relates to transmission devices, and particularly to the class of devices for transmitting mechanical force intermittently at will.

One object of my invention is to provide a device for transmitting mechanical force from one body to another intermittently at will, and to this end I provide a clutch mechanism for connecting a driving member to a driven member, which mechanism may be actuated to operative or inoperative condition.

Another object is to provide means operative to transmit mechanical force, predetermined in extent, from a driving element to a driven element, and to this end I provide a transmission mechanism which may be set into operative condition and thereafter automatically becomes inoperative.

Other and further objects and advantages will appear from the following description, taken in connection with the accompanying drawings, forming part of this specification, and will be pointed out in the claims.

In the accompanying drawings, in which like reference characters indicate similar parts, Figure 1 is a view of a clutch embodying my invention, the view showing certain parts in section and one of the plates of the clutch removed;

Fig. 2 is a sectional view of the device shown in Fig. 1;

Fig. 3 is a partial sectional view on the line 3—3 of Fig. 1.

In order to disclose my invention, I will describe a preferred embodiment thereof, comprising a clutch, adapted to be manually put into operative condition, and to be automatically rendered inoperative after a predetermined extent of operation.

The clutch herein disclosed is disclosed in my copending application for a patent for printing machines, filed November 12, 1915, Serial Number 61,004, of which this application is a division.

In the device herein described and illustrated for the purpose of disclosing my invention, shaft 1 comprises a member to be driven, and the gear wheel 2 comprises a driving member. Of course, as is true in most cases, the driving and driven members could be reversed. Shaft 1 is journaled in the front plate 3 mounted in the frame 4. Attached to the driving member, as by rivets 5, is a plate 6, which carries a cylindrical flange 7. The gear wheel 2 and the plate 6 are journaled upon the shaft 1. Keyed to the shaft 1 by keys 10 are two plates 8 and 9. Positioned between plates 8 and 9 and mounted for rotation upon pins 11 extending between said plates are transmission elements 12. The pins 11 are arranged in a circle about the axis of the shaft 1. The elements 12 are proportioned so that the distance between the centers of the pins 11 and the outer ends of the elements, which ends are arcuate, is greater than the distance between the axes of the pins 11 and the inner face of the flange 7. Pins 13 are arranged in a circle about the axis of the shaft 1, and mounted for rotation upon them are links 14. The outer ends of the links 14 are provided with slots 15, and the inner ends of the elements 12 are provided with slots 16. The inner ends of the elements 12 are formed with bifurcations 17, and the outer ends of the links are provided with tongues 18, which extend between the bifurcations 17. There are two rings 19, which are positioned on opposite sides of the tongues 18 and between said tongues and the bifurcations 17. The rings 19 carry pins 20, which fit within the slots 16 and 15, respectively, of the elements 12 and the links 14. Pins 21 extend between plates 8 and 9 and hold the rings 19 concentric with the shaft 1. Springs 22, attached to the links 14 and to the plate 8, tend to swing the links 14 around their pivots 13 in such a manner that the elements 12 will be swung into engagement with the inner face of the flange 7.

It will be seen that, if the driving member is rotated in the direction of the arrow and the elements are in engagement with the inner face of the flange 7, a jamming action will occur between the flange 7, links 12 and pins 11, and the driven member will be rotated. A reversal of the direction of movement of the driving member will cause a cessation of the jamming action and the driven member will no longer be rotated.

In order that the driving member, when it moves in the direction of the arrow, will not move the driven member continuously, one of the links 12 is provided with a pin 23, and a pin 24 is caused to move into the path of the pin 23 by the action of spring 25, so that the elements 12, which are caused to move simultaneously, since they are connected together by the rings 19 and the pins 20, will be moved out of engagement with the flange 7. This will occur whenever the driving member is moving the driven member and the pin 24 moves into the path of the pin 23. As soon as the pin 24 is moved out of the path of the pin 23, the elements 12 will be permitted to swing about the pins 11 and into engagement with the inner face of the flange 7. The plate 9 is provided with a slot 9', shown in Fig. 3, into which the pin 24 moves under the action of the spring 25 when the slot is in the proper position, so that the pin 24 will coöperate with the pin 23 mounted in the link 12. It will be seen that, if the parts are in the position shown in the drawings and the pin 24 is drawn back against the pressure of the spring 25, the elements 12 will come into engagement with the flange 7, and the shaft 1 will be driven; the spring 25 will cause the pin 24 to move back into the path of the pin 23, and, as soon as the driven member has made one rotation, the pin 23 will again strike against the pin 24, and the transmission elements 12 will be moved out of engagement with the flange 7 and the driven member will come to rest.

The pin 26 is fixed in the plate 8 to limit the rotation of that element 12 which carries the pin 23. When the pin 23 strikes the pin 24, the inertia of the driven parts carries forward the plates 8 and 9, so that the elements 12 are swung about their pivot pins 11. The pin 26 limits the rotation of the elements 12, so that they do not rotate so far that the pin 23 will slide past the pin 24.

It is apparent that many variations, modifications and adaptations of my device will occur to those skilled in the art, and it is my intention that my invention shall be considered to include such variations, adaptations and modifications, and that it shall be defined only by the hereunto-appended claims, and not limited to the specific structure described for the purpose of disclosing it.

What I claim and desire to secure by Letters Patent of the United States is the following:—

1. In a device of the class described, a constantly-moving member, a member to be driven thereby, a plurality of links pivoted to one of said members, each pivot being nearer to the other member than to one end of its corresponding link, means tending to swing said end of said links into engagement with the other member, one of said links having a projection thereon between its corresponding pivot and the afore-mentioned end of the link, a stationary support, and a part mounted thereon and normally held in the path of said projection.

2. In a device of the class described, a constantly-moving member, a member to be driven, an element carried by one of said members and supported against movement in a path substantially perpendicular to the path of movement of an adjacent portion of the other of said members and rotatable about an axis, said other member being nearer said axis than one end of said element, a stationary member and means mounted thereon for retarding the motion in one direction of that part of said element between said axis and said end.

3. In a device of the class described, a transmission element comprising a constantly-moving driving ring, a plate coaxial therewith and adapted to be driven therefrom, a link pivoted to said plate, the pivot being slightly nearer to the surface of said ring than to one end of said link, means acting on said link to swing said first-mentioned end into contact with said ring, a stationary member and a part mounted thereon and movable into the path of that part of the link between said ring and said pivot.

4. In a device of the class described, a transmission element comprising a constantly-moving driving ring, a plate coaxial therewith and adapted to be driven therefrom, a link pivoted to said plate, the pivot being slightly nearer to the surface of said ring than to one end of said link, a spring acting on said link to swing said first-mentioned end into contact with said ring, a housing for said element, and a pin mounted in said housing and movable into the path of that part of the link between said ring and said pivot.

In testimony whereof, I have signed my name to this specification.

PERCIVAL DIGNAN.

Copies of this patent may be obtained for five cents each, by addressing the "Commissioner of Patents, Washington, D. C."